United States Patent
Sule et al.

(10) Patent No.: US 9,811,452 B2
(45) Date of Patent: Nov. 7, 2017

(54) PROFILING SYSTEM FOR COMPUTING DEVICES

(71) Applicant: Qualcomm Innovation Center, Inc., San Diego, CA (US)

(72) Inventors: Dineel D. Sule, San Diego, CA (US); Subrato K. De, San Diego, CA (US); Wilson Kwan, Markham (CA)

(73) Assignee: QUALCOMM Innovation Center, Inc., San Diego, CA (US)

( * ) Notice: Subject to any disclaimer, the term of this patent is extended or adjusted under 35 U.S.C. 154(b) by 34 days.

(21) Appl. No.: 15/011,851

(22) Filed: Feb. 1, 2016

(65) Prior Publication Data

US 2016/0239408 A1    Aug. 18, 2016

Related U.S. Application Data (60) Provisional application No. 62/116,055, filed on Feb. 13, 2015.

(51) Int. Cl.
| | |
|---|---|
| G06F 9/44 | (2006.01) |
| G06F 11/36 | (2006.01) |
| G06F 9/45 | (2006.01) |
| G06F 11/34 | (2006.01) |

(52) U.S. Cl.
CPC ......... *G06F 11/3688* (2013.01); *G06F 8/443* (2013.01); *G06F 8/70* (2013.01); *G06F 11/34* (2013.01); *G06F 11/3612* (2013.01)

(58) Field of Classification Search
None
See application file for complete search history.

(56) References Cited

U.S. PATENT DOCUMENTS 6,349,406 B1 * 2/2002 Levine ............... G06F 11/3466
717/128

* cited by examiner

*Primary Examiner* — Qamrun Nahar
(74) *Attorney, Agent, or Firm* — Neugeboren O'Dowd PC (57) ABSTRACT

Systems and methods for profiling application code are disclosed. The method is hybrid in nature as it may include inserting instrumentation within application code and also periodic sample gathering, by employing a runtime app profile generator that provides the hybrid profiling infrastructure and is linked to the application code. An executable user application is then generated from the application code, and the executable user application is executed. The runtime app profile generator is then launched in response to the execution of the application code, and hybrid profiling results are generated by obtaining samples from the different threads of the executed application code and accumulating instrumented execution information. In some implementations, the hybrid profiling results capture even cold regions of the code and can also be used for a next round of profiling through automated targeted instrumentation.

17 Claims, 5 Drawing Sheets

PROFILING SYSTEM FOR COMPUTING DEVICES

CLAIM OF PRIORITY UNDER 35 U.S.C. §119

The present Application for Patent claims priority to Provisional Application No. 62/116,055 entitled "PROFILING SYSTEM FOR COMPUTING DEVICES" filed Feb. 13, 2015, and assigned to the assignee hereof and hereby expressly incorporated by reference herein.

BACKGROUND

Field

The present disclosed embodiments relate generally to software profiling tools, and more specifically to profiling user space applications.

Background

As codebases grow and open source software modules drive code libraries towards becoming black-boxes, profiling tools are critically important for end users to properly understand hotspots in their applications. The area of profilers is well researched and developed for several decades now. Typical profiling approaches rely on utilizing system profiling tools such as LINUX "perf," which in turn have capabilities to read built in system sampling counters and provide users with an accurate system-wide perspective of application performance. Other alternatives rely on extensive instrumentation of either compiler-generated code (thereby affecting and modifying application performance) or user initiated manual modification of source code to derive hotspot profiles. To summarize, the approaches either rely on platform support (LINUX-perf) or are slow and utilize extensive application wide instrumentation or require user-initiated modification of source code.

The problem of availability of such a profiling capability is even more pronounced in the realm of mobile devices, especially when dealing with user space applications. The system support (for utilities such as "perf") is virtually non-existent in the default configuration of a mobile operating system such as the ANDROID operating system. Adding support for perf is possible, but it requires rooting the devices, which is an onerous process, and typical user space developers are hesitant to do so. Utilizing the extensive compiler driven instrumented profiling approach tends to shift the hotspots because it affects the overall execution speed, and is even more pronounced in threaded applications. User initiated source code modification is possible, but it requires that users actually understand all of their code (including third party libraries) and is also a maintenance headache.

SUMMARY

An aspect of the present invention is a method for profiling application code that includes inserting instrumentation within the application code and linking the application code to a runtime app profile generator for gathering per-thread samples. An executable user application is generated from the application code, and the executable user application is executed. The runtime app profile generator is launched in response to the execution of the application code, and hybrid profiling results are generated by obtaining samples from different threads of the executed application code and accumulating instrumented execution information.

Another aspect may be characterized as an apparatus for profiling application code. The apparatus includes one or more processors to execute threads of a user application and a sampling signal generator configured to interrupt execution of the threads to obtain thread-aware samples. The apparatus also includes a thread database configured to store the thread-aware samples and a sample processor configured to generate hybrid profile results by receiving instrumented execution information and the thread-aware samples from the thread database.

Yet another aspect may be characterized as a non-transitory, tangible processor readable storage medium, encoded with processor readable instructions to perform a method for profiling application code that includes inserting instrumentation within application code and linking the application code to a runtime app profile generator for gathering per-thread samples. An executable user application is generated from the application code, and the executable user application is executed. The runtime app profile generator is launched in response to the execution of the application code, and hybrid profiling results are generated by obtaining samples from different threads of the executed application code and accumulating instrumented execution information.

DETAILED DESCRIPTION

Disclosed herein is an approach that provides typical user space application developers with a lightweight profiling capability that may be automatic, works using user space system application programming interfaces ("APIs") and operating system calls so the approach works on non-rooted devices. In addition, embodiments of this approach are very unobtrusive in nature, and may rely on some widely available compiler features.

Figure 1:
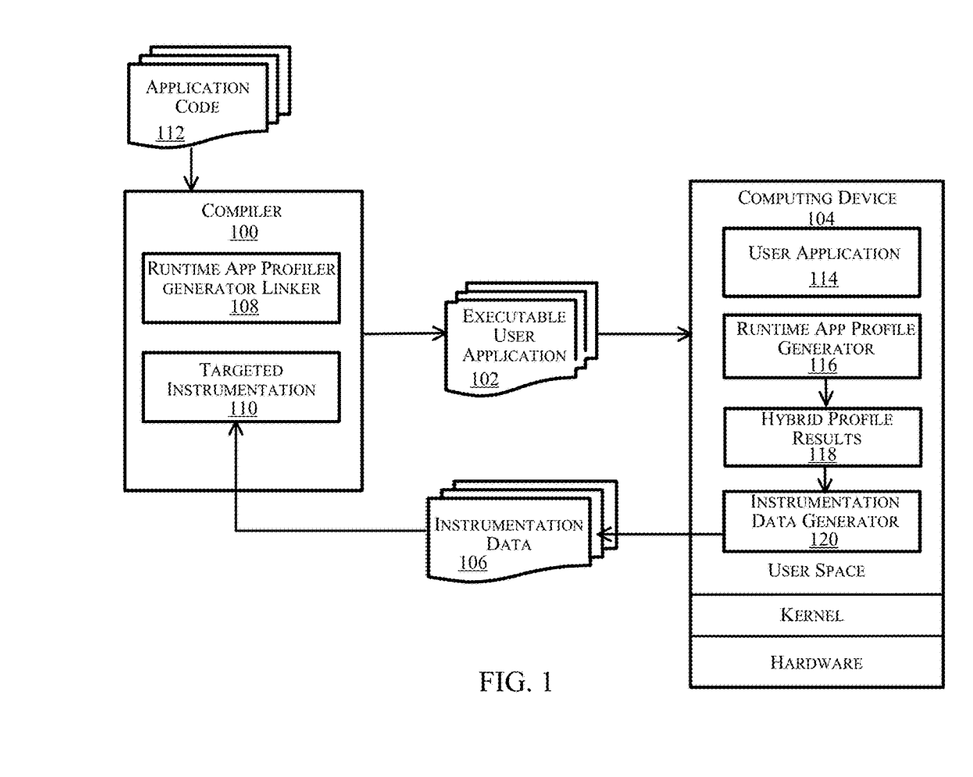
FIG. 1 is a block diagram depicting a system for profiling a user application.

Referring to FIG. 1, shown is a block diagram depicting an application profiler system. As shown, aspects of the system include a compiler 100 that generates an executable user application 102 that is received by a computing device 104, and the computing device 104 generates hybrid profile results 118 and also instrumentation data 106 (e.g., machine-readable instrumentation data) that can be utilized by the compiler 100 for further profiling as discussed in more detail further herein. As shown, the compiler 100 includes a runtime-app-profiler linker 108 and a targeted instrumentation module 110. The compiler 100 operates to generate executable user code such as the executable user application 102, but in addition, the runtime-app-profiler linker 108 and a targeted instrumentation module 110 facilitate novel aspects to the unique hybrid profiling system depicted in FIG. 1.

As shown, user space of the computing device 104 includes a user application 114, a runtime app profile generator 116 that produces hybrid profile results 118 (also referred to herein as hybrid profiling results 118), and an instrumentation data generator 120 that generates the instrumentation data 106. The computing device 104 may be realized by any of a variety of devices that are capable of executing the executable user application 102 such as a smartphone, tablet, netbook, and developer device. Although the compiler 100 and the computing device 104 are depicted as separate components in FIG. 1, it should be recognized that that the compiler 100 and the computing device 104 may be realized as components of a unitary apparatus such as a smartphone, tablet, netbook, and developer device. The application code 112 may be source code prepared by a developer that is compiled by the compiler 100 to generate the executable user application 102, which is executed by the computing device 104 as the user application 114. And the user application 114, is the executable user application 102 created by the compiler 100 from application code 112, and is loaded on the computing device 104. The application code 112 (hence the executable user application 102 and the user application 114) may be any of a variety of application types including entertainment apps (e.g., games) and productivity apps (e.g., business-related apps).

The runtime-app-profiler linker 108 operates to link the application code 112 to the runtime app profile generator 116 so that when the user application 114 is executed on the computing device 104, the runtime app profile generator 116 is launched on the computing device 104. When launched, the runtime app profile generator 116 functions to sample attributes of one or more threads of the user application that are executed to generate thread-aware samples that may form a portion of the hybrid profile results 118. The sample attributes, for example, may include address data, thread identification, and call stack information. Using the thread-aware samples and the current instrumented results in the hybrid profile results 118, the instrumentation data generator 120 may generate the instrumentation data 106 that could be used for an enhanced instrumentation profile of the application code in the next iteration of the hybrid profiler run. The thread-aware samples of the hybrid profile results for example, may be used to identify "hotspots" in portions of the application code 112 (when executed as the user application 114) that warrant further monitoring. The instrumentation data 106 generally indicates the portions of the application code to be targeted for instrumentation, and the instrumentation data 106 may be machine-readable information that provides direction to the targeted instrumentation module 110.

The targeted instrumentation module 110 generally functions to insert instrumentation into specific, targeted portions of the application code 112 that are selected based upon the hybrid profile results 118 of the previous profiler run or some default initial instrumentation targets. Thus, in some embodiments support is provided to automatically instrument function entry points as the default initial instrument targets. During a subsequent iteration of compiling the application code (e.g., for additional analysis on the computing device 104), the targeted instrumentation module 110 inserts the targeted instrumentation into the application code 112 during the compilation process so that the executable user application 102 includes the targeted instrumentation (e.g., that instruments hotspots in the application code 112).

When the executable user application 102 is executed again as the user application 114, the runtime app profile generator 116 generates the hybrid profile results 118 based on both sampling as well as the targeted instrumentation. Thus, the hybrid profile results 118 are the result of both sampling (which is statistical) and instrumentation (which is more fine grained and accurate). Thus, in the embodiment depicted in FIG. 1, a hybrid instrumentation-sampling technique is realized for automatic discovery and marshalling of profiling targets executing within the context of the user application 114, and no root level access to the kernel of the computing device 104 is required.

When operated, a user builds the executable user application 102 with the compiler 100 and targeted instrumentation of function entry/exit points or a custom hook is added to the application code 112 during the compilation process using the targeted instrumentation module 110. Instrumented points of the resultant executable user application 102 call into the app profile generator 116 that is linked into the executable user application 102 (by the runtime-app-profiler linker 108).

Figure 2:
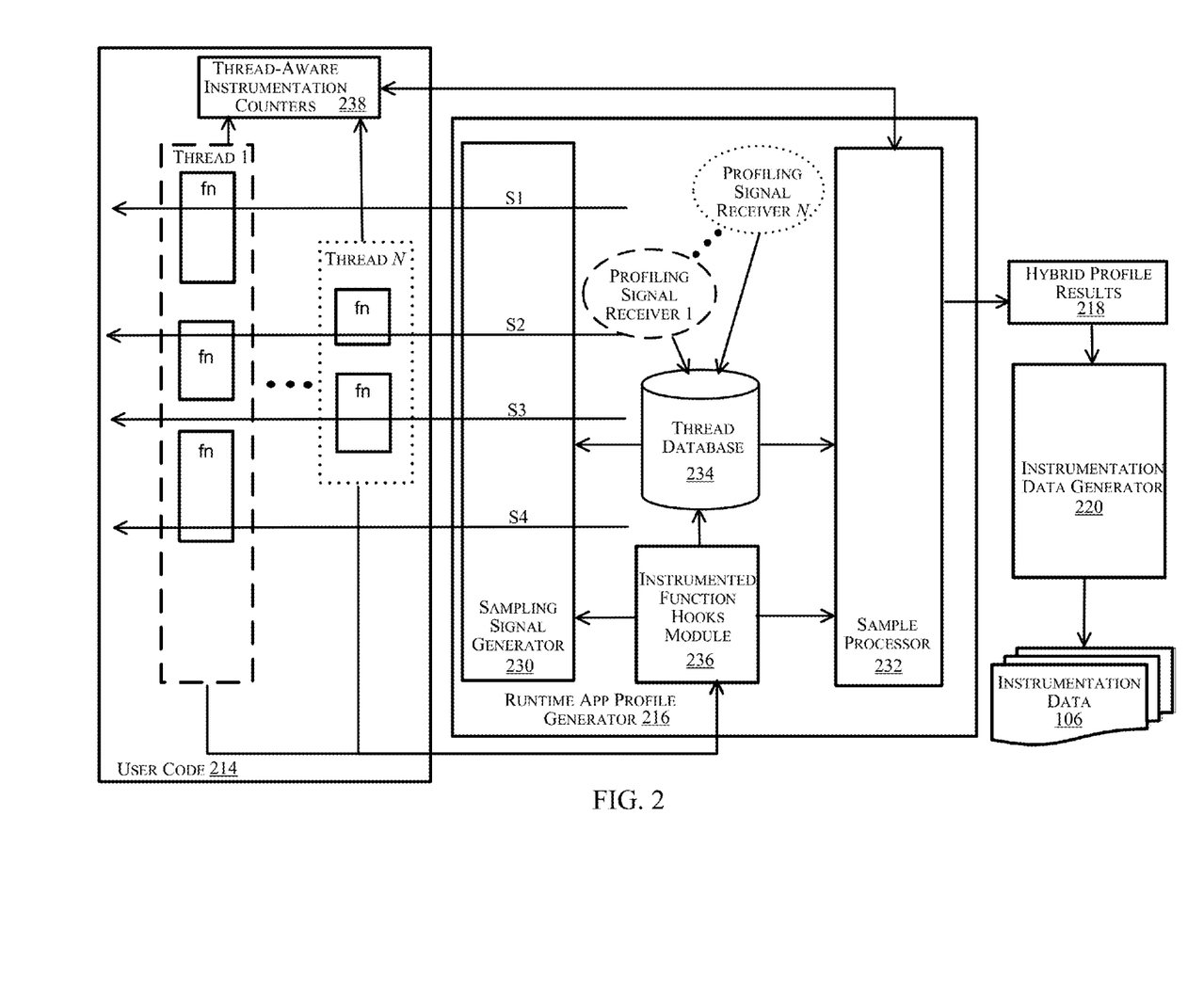
FIG. 2 is a block diagram illustrating aspects of the system depicted in FIG. 1.

Referring next to FIG. 2, it is a block diagram depicting aspects that may be realized by the computing device 104 described with reference to FIG. 1. In this embodiment, the runtime app profile generator 116 described with reference to FIG. 1 is implemented with a runtime app profile generator 216 that includes a sampling signal generator 230 and a sample processor 232. And coupled to each of the sampling signal generator 230 and the sample processor 232 are a thread database 234 and an instrumented function hooks module 236. In addition, the runtime app profile generator 216 also includes N profile signal receivers that each corresponds to one of N threads that are a part of user code 214 that is executed when the user application 114 is launched.

For simplicity, a single line is shown from each of the N threads to the instrumented function hooks module 236, but it should be recognized that each of the depicted functions (fn) within the N threads is in communication with the instrumented function hooks module 236. Also shown in the user code 214 are thread-aware instrumentation counters 238 that are included in the user code 214 and are configured to receive information from the N threads and provide the instrumented execution information to the sample processor 232. More specifically, the thread-aware instrumentation counters 238 are the result of the instrumentation that is inserted into the application code 112 by known or default instrumentation (during a first iteration of the execution of the user application 114) or by the targeted instrumentation module 110 (in response to the instrumentation data 106), and the thread-aware instrumentation counters 238 reside in a memory space shared by the N threads of the user code 214

As shown, the sample processor 232 generates hybrid profile results 218 (also referred to herein as hybrid profiling results 218) that are utilized by an instrumentation data generator 220 to create the instrumentation data 106 described with reference to FIG. 1. While referring to FIG. 2, simultaneous reference is made back to FIG. 1 and forward to FIG. 3, which is a flowchart that depicts a method that may be traversed in connection with the embodiments described herein.

Figure 3:
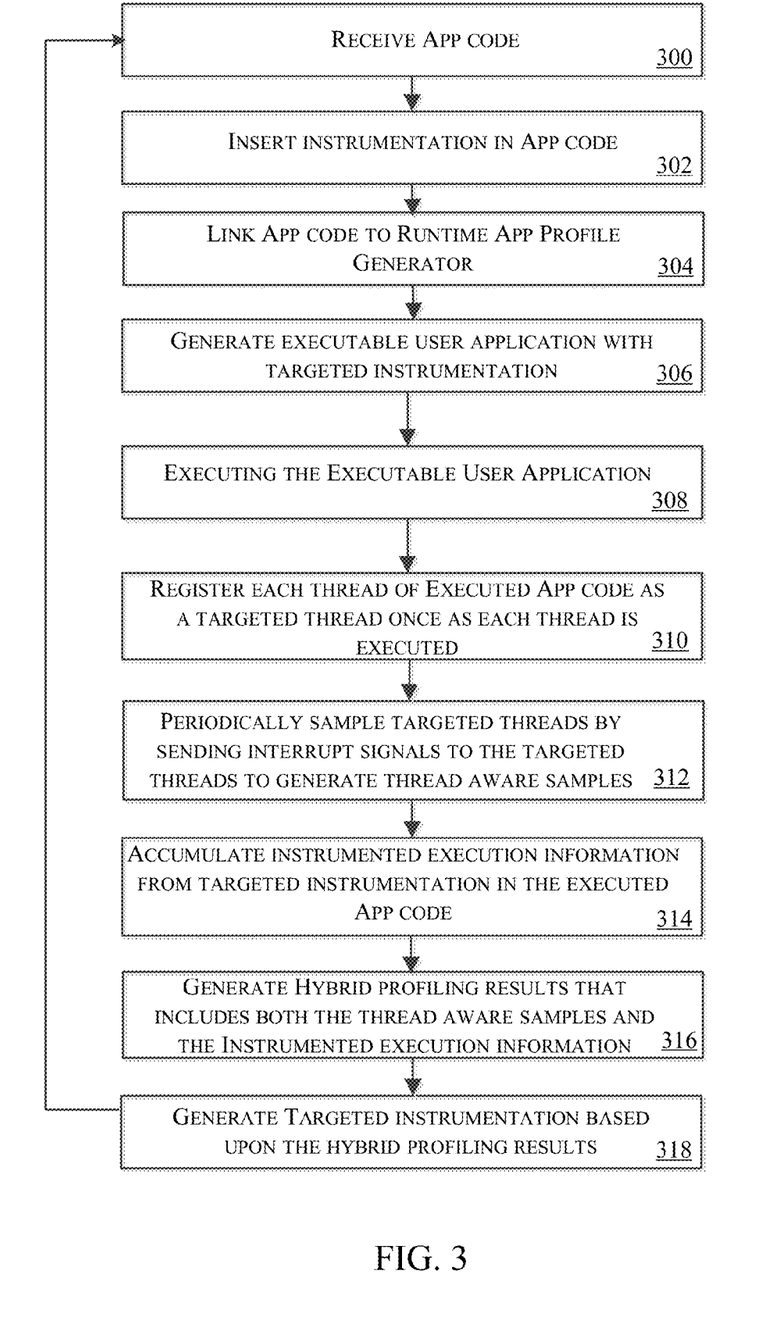
FIG. 3 is a flowchart depicting a method that may be traversed in connection with embodiments disclosed herein.

As shown in FIG. 3, when the compiler 100 receives application code 112 (Block 300), instrumentation is inserted in the application code 112, and the application code 112 is linked to the runtime app profile generator 116, 216 (Block 302). As discussed above, during a first iteration of compiling the application code 112, the targeted instrumentation module 110 will not yet have instrumentation data 106 that is generated by actual execution of the user application 114, so the instrumentation that is inserted during the first iteration may be a default-type of instrumentation that is utilized for all application code 112, or in some instances, a user may dictate the instrumentation that is inserted in the application code 112.

As depicted, the compiler 100 generates the executable user application 102 (that is linked to the runtime app profile generator 116 and includes the instrumentation), and the computing device 104 executes the executable user application 102 (Block 308). At the function entry/exit hook of the user application 114, an initial launch of the runtime app profile generator 216 is performed, which prompts the sampling signal generator 230, the sample processor 232, and the instrumented function hooks module 236 to be installed.

As each of the N user-level threads of the executable user application 114 is executed, each of the N user-level threads registers itself as a profiler target (also referred to as a targeted thread) of the sampling signal generator 230 (Block 310). In many implementations, each of the N user-level threads registers itself only once with the runtime app profile generator 216, and the instrumented function hooks module 236 allocates thread local storage in the thread database 234 associated with the registered N user-level threads to accumulate the addresses to be gathered by the sampled threads. And as shown in FIG. 2, for each of the registered N user-level threads, a corresponding one of the N profiling receivers are launched.

As shown, the sampling signal generator 230 periodically sends interrupt signals to the N user level threads (to periodically interrupt execution of each of the threads), and each of the N profile signal receivers receives thread aware samples from a corresponding one of the N threads (Block 312). In many implementations, the sampling signal generator 230 is configured to wake up at decided intervals and to send profiling signals to the available registered threads, and the profiling signal receivers operate within the context of each thread capture and accumulate execution addresses.

In addition, instrumented execution information (that results from the instrumentation) is also accumulated (Block 314). As shown, the thread-aware instrumentation counters 238 in the embodiment depicted in FIG. 2 are accessed and updated by the instrumented user code 214 at runtime. The sample processor 232 then generates the hybrid profiling results 218 by marshalling and combining the thread aware samples and the instrumented execution information as part of the hybrid profile results 218.

Thus, a profile of the user application 114 is created from both sampling (at Block 312) and instrumentation (at Block 314). The hybrid profiling results 118, 218 may be used by a developer of the user application 114 to assess (e.g., monitor performance, guide optimizations, and diagnose errors) the user application 114 in user space, without kernel support while using statistical sampling at thread-level granularity.

Another novel aspect of the disclosed approach is the ability to augment the method described with reference to Blocks 300-316 using targeted in-depth instrumentation. More specifically, the novel hybrid sampling-instrumentation approach described with reference to Blocks 300-316 may be used as a first round to statistically identify relevant code segments in any user application (e.g., by analyzing the hybrid profiling results), and in response, generate the instrumentation data 106 to target those relevant code segments. The targeted instrumentation module 110 may then use the instrumentation data 106 to generate and insert the targeted instrumentation in certain focused regions of the application code (Block 302), and the method described with reference to Blocks 304-316 may be repeated again with instrumentation of the pre-identified code segments. This targeted instrumentation will then clearly expose hot control-flow pathways and hot loops in very complex code.

Figure 4:
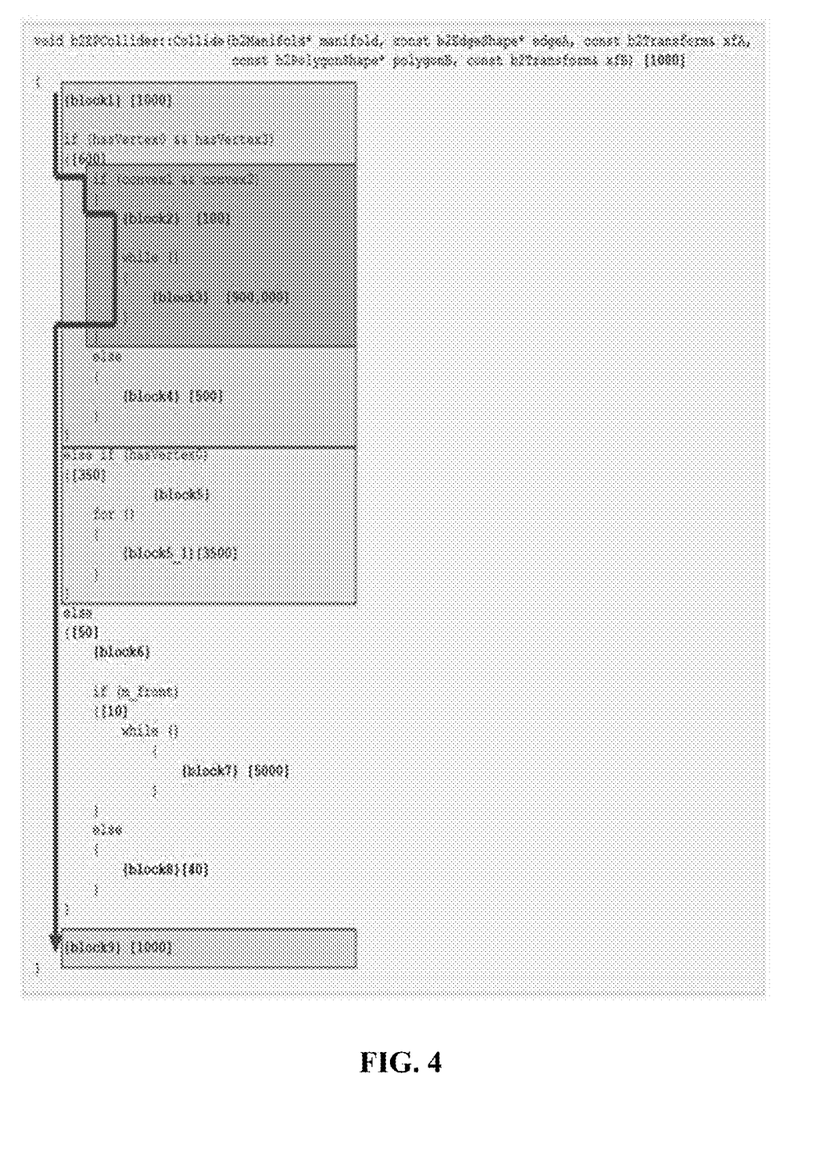
FIG. 4 is a diagram depicting potential issues within application code that may be targeted for instrumentation.

Referring to FIG. 4 for example, the point in the code labeled "block 3" is a hotspot where targeted instrumentation may be desired. In particular, counter values associated with the code blocks shown in FIG. 4 indicate a number of times that each code block was counted for an execution profile. As shown, for block 3 the number 900,000 denotes that in the last profile run block 3 executed 900,000 times. The counter values in FIG. 4 also indicate that block 4 executed 500 times and block 5_1 executed 3500 times. The higher the counter values are, the hotter the block is in the profile; thus block 3 is a hotspot relative to block 4 and block 5_1.

In addition to the above-described novel aspects, the disclosed hybrid instrumentation-sampling approach has other novel aspects. In a pure sampling approach (as available with established solutions, such as Perf) it is virtually impossible to clearly identify cold application segments. This is because of the nature of statistical sampling where a code segment with 0 samples is not necessarily "dead" or cold code. It just means that the code with 0 samples is below the sampling threshold and if the threshold is not low enough (or the sample set is not wide enough) could potentially contain moderately hot/warm code segments. Also, when the profile is very flat, the difference between non-zero and zero samples in statistical sampling is inaccurate.

The hybrid approach may help identify cold/non-executed segments by utilizing the instrumentation half of the disclosed solution to clearly identify cold/non-executed functions. Even if statistical sampling shows zero samples, if the same code segment is instrumented using the disclosed hybrid approach to using sampling and instrumentation, a counter may show non-zero counts even if that same code segment is executed just once. Aspects disclosed herein thereby lend a degree of novel predictability that is missing in pure statistical sampling approaches without adding excessive overhead as in a pure instrumented approach.

Figure 5:
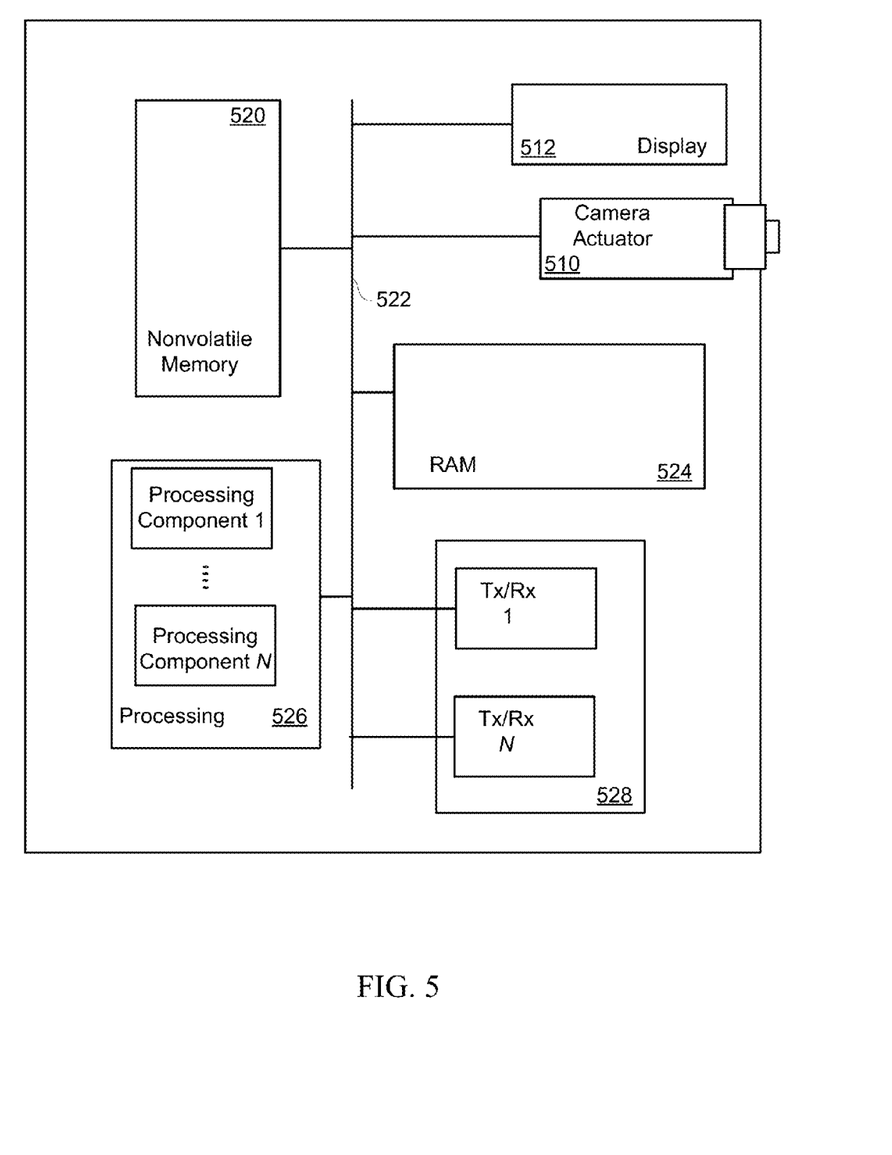
FIG. 5 is a block diagram illustrating exemplary components that may be utilized to realize embodiments disclosed herein.

Referring to FIG. 5, shown is a block diagram depicting exemplary physical components that may be used in connection with realizing the components depicted in FIGS. 1 and 2. As shown, a camera actuator 510, display portion 512, and nonvolatile memory 520 are coupled to a bus 522 that is also coupled to random access memory ("RAM") 524, a processing portion (which includes N processing components) 526, and a transceiver component 528. Although the components depicted in FIG. 5 represent physical components of a mobile computing device (such as the computing device 104 depicted in FIG. 1) it is not intended to be a hardware diagram; thus many of the components depicted in FIG. 5 may be realized by common constructs or distributed among additional physical components. Moreover, it is certainly contemplated that other existing and yet-to-be developed physical components and architectures may be utilized to implement the functional components described with reference to FIGS. 1 and 2.

In general, the nonvolatile memory 520 functions to store (e.g., persistently store) data and executable code including code that is associated with the functional components depicted in FIGS. 1 and 2. In some embodiments of the computing device depicted in FIG. 1 for example, the nonvolatile memory 420 includes bootloader code, modem software, operating system code, file system code, and non-transitory processor executable instructions to implement the hybrid instrumentation-sampling approach disclosed herein.

In many implementations, the nonvolatile memory 520 is realized by flash memory (e.g., NAND or ONENAND™ memory), but it is certainly contemplated that other memory types may also be utilized. Although it may be possible to execute the non-transitory code from the nonvolatile memory 520, the executable code in the nonvolatile memory 520 is typically loaded into RAM 524 and executed by one or more of the N processing components in the processing portion 526.

The N processing components 526 in connection with RAM 524 generally operate to execute the instructions stored in nonvolatile memory 520 to effectuate the functional components depicted in FIG. 1. As one of ordinarily skill in the art will appreciate, the processing components 526 may include multiple processor cores a video processor, modem processor, DSP, graphics processing unit (GPU), MDP, and other processing components.

The depicted transceiver component 528 includes N transceiver chains for communicating with external devices. Each of the N transceiver chains represents a transceiver associated with a particular communication scheme. For example, one transceiver chain may operate according to wireline protocols, another transceiver may communicate according to WiFi communication protocols (e.g., 802.11 protocols), another may communicate according to cellular protocols (e.g., code division multiple access (CDMA) or global system for mobile (GSM) protocols), and yet another may operate according to Bluetooth protocols. Although the N transceivers are depicted as a transceiver component 528 for simplicity, it is certainly contemplated that the transceiver chains may be separately disposed about the mobile computing device.

This display 512 generally operates to provide text and non-text content (e.g., user-interface animations) to a user. Although not depicted for clarity, one of ordinary skill in the art will appreciate that other components including a display driver and backlighting (depending upon the technology of the display) are also associated with the display 512.

The architecture depicted in FIG. 5 is exemplary only and one or more of the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, or microcontroller. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, erasable programmable read-only memory (EPROM) memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for profiling application code, the method comprising:
inserting instrumentation within application code;
linking the application code to a runtime app profile generator for gathering per thread samples;
generating an executable user application from the application code;
executing the executable user application;
launching the runtime app profile generator in response to execution of the application code;
registering with the runtime app profile generator, during execution of the executable user application, each of different threads of the executable user application as each of the different threads is initiated;
periodically sampling each of the different threads, without kernel-level support, during execution of the executable user application to obtain periodic samples of each of the different threads; and
generating hybrid profiling results using the periodic samples from each of the different threads of the executable user application and accumulated instrumented execution information.

2. The method of claim 1 including:
generating instrumentation data based upon the hybrid profiling results, and wherein targeted instrumentation for a next iteration of profiling is targeted based upon the instrumentation data generated from the results of a previous iteration of hybrid profiling.

3. The method of claim 2, including:
automatically inserting the targeted instrumentation in the application code in particular regions of the application code that are selected based on the instrumentation data generated from the results of the previous iteration of hybrid profiling.

4. The method of claim 1, including:
registering, once when each of the threads is initiated, each thread as a targeted thread with the runtime app profile generator.

5. The method of claim 4, wherein interrupting the execution of each of the threads to periodically sample each of the threads includes utilizing statistical sampling without kernel-level support.

6. The method of claim 1, wherein the instrumentation inserted within the application code includes counters inserted with in the application code.

7. The method of claim 6, wherein each of the counters indicates a non-zero count when a corresponding portion of the application code is executed once.

8. An apparatus for profiling application code, the apparatus comprising:
one or more processors to execute threads of a user application;
a sampling signal generator configured to:
register, during execution of the user application, each of the threads of the user application as each of the threads is initiated; and
sample, without kernel-level support, execution of the threads to obtain thread-aware samples during execution of the user application;
a thread database configured to store the thread-aware samples; and
a sample processor configured to generate hybrid profile results by receiving instrumented execution information and the thread-aware samples from the thread database.

9. The apparatus of claim 8 including an instrumentation data generator configured to generate machine-readable instrumentation data from the hybrid profile results.

10. The apparatus of claim 9, including:
a compiler to generate executable user code of the user application, wherein the compiler includes:
a runtime-app-profiler-generator linker to link the executable user code to the sampling signal generator; and
a targeted instrumentation module configured to receive the machine-readable instrumentation data and insert targeted instrumentation within the executable user code, wherein the targeted instrumentation within the executable user code is configured to generate the instrumented execution information.

11. A non-transitory, tangible processor readable storage medium, encoded with processor readable instructions to perform a method for profiling application code, the method comprising:
inserting instrumentation within application code;
linking the application code to a runtime app profile generator for gathering per thread samples;
generating an executable user application from the application code;
executing the executable user application;
launching the runtime app profile generator in response to execution of the application code;
registering with the runtime app profile generator, during execution of the executable user application, each of different threads of the executable user application as each of the different threads is initiated;
periodically sampling each of the different threads, without kernel-level support, during execution of the executable user application to obtain periodic samples of each of the different threads; and
generating hybrid profiling results using the periodic samples from each of the different threads of the executable user application and accumulated instrumented execution information.

12. The non-transitory, tangible processor readable storage medium of claim 11, the method including:
generating instrumentation data based upon the hybrid profiling results, and wherein targeted instrumentation for a next iteration of profiling is targeted based upon the instrumentation data generated from the results of a previous iteration of hybrid profiling.

13. The non-transitory, tangible processor readable storage medium of claim 12, the method including:
automatically inserting the targeted instrumentation in the application code in particular regions of the application code that are selected based on the instrumentation data generated from the results of the previous iteration of hybrid profiling.

14. The non-transitory, tangible processor readable storage medium of claim 11, the method including:
registering, once when each of the threads is initiated, each thread as a targeted thread with the runtime app profile generator.

15. The non-transitory, tangible processor readable storage medium of claim 14, wherein interrupting the execution of each of the threads to periodically sample each of the threads includes utilizing statistical sampling without kernel-level support.

16. The non-transitory, tangible processor readable storage medium of claim 11, wherein the instrumentation inserted within the application code includes counters inserted with in the application code.

17. The non-transitory, tangible processor readable storage medium of claim 16, wherein each of the counters indicates a non-zero count when a corresponding portion of the application code is executed once.

* * * * *